(12) United States Patent
Eshelman et al.

(10) Patent No.: US 7,819,411 B2
(45) Date of Patent: Oct. 26, 2010

(54) SIX LINK INDEPENDENT SUSPENSION FOR A DRIVE AXLE

(75) Inventors: Edward J. Eshelman, Rochester Hills, MI (US); Gregory D. Pavuk, Royal Oak, MI (US); Gordon Aaron Weeks, Auburn Hills, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 631 days.

(21) Appl. No.: 11/415,668

(22) Filed: May 2, 2006

(65) Prior Publication Data

US 2006/0261570 A1 Nov. 23, 2006

Related U.S. Application Data

(60) Provisional application No. 60/682,893, filed on May 20, 2005.

(51) Int. Cl.
*B60G 3/20* (2006.01)

(52) U.S. Cl. .................. 280/124.135; 280/124.137; 280/124.145

(58) Field of Classification Search .......... 280/124.135, 280/124.134, 124.141, 124.145, 124.137; 180/252, 253, 359, 360
See application file for complete search history.

(56) References Cited

U.S. PATENT DOCUMENTS

| | | | | | |
|---|---|---|---|---|---|
| 2,010,415 | A | * | 8/1935 | Franz | 180/360 |
| 2,344,380 | A | * | 3/1944 | Barenyi et. al. | 180/360 |
| 2,866,651 | A | * | 12/1958 | Powell | 280/124.141 |
| 4,377,298 | A | * | 3/1983 | Finn et al. | 280/124.142 |
| 4,538,831 | A | * | 9/1985 | Kami et al. | 280/124.138 |
| 4,813,704 | A | * | 3/1989 | Smith | 280/124.109 |
| 4,957,307 | A | * | 9/1990 | Gandiglio | 280/124.141 |
| 4,974,872 | A | * | 12/1990 | Riese | 280/124.155 |
| 4,995,633 | A | * | 2/1991 | Santo | 280/124.146 |
| 5,375,870 | A | * | 12/1994 | Smith et al. | 180/299 |
| 5,380,035 | A | * | 1/1995 | Lee | 280/124.143 |

(Continued)

FOREIGN PATENT DOCUMENTS

DE 100 30 028 12/2001

(Continued)

OTHER PUBLICATIONS

European Search Report, Jul. 31, 2006.

(Continued)

*Primary Examiner*—Paul N Dickson
*Assistant Examiner*—Timothy D Wilhelm
(74) *Attorney, Agent, or Firm*—Carlson, Gaskey & Olds (57) ABSTRACT

An independent suspension includes upper and lower control arms that are coupled to a knuckle that supports a wheel assembly. A spring bracket is pivotally connected to the lower control arm. A drive shaft extends through an opening in the spring bracket to drive the wheel assembly. The spring bracket includes first and second support plates that respectively support first and second springs on opposite sides of the drive shaft. A torque rod is pivotally connected to the spring bracket. The torque rod and the upper and lower control arms are also mounted to a vehicle frame member. The torque rod, knuckle, spring bracket, upper and lower control arms, and vehicle structure cooperate to provide a six link control that accommodates large wheel jounce travel.

26 Claims, 6 Drawing Sheets

U.S. PATENT DOCUMENTS

| | | | | |
|---|---|---|---|---|
| 5,435,591 | A * | 7/1995 | Lee | 280/124.139 |
| 5,439,244 | A * | 8/1995 | Tomosada et al. | 280/124.139 |
| 5,782,484 | A * | 7/1998 | Kuhn, Jr. | 280/124.142 |
| 6,105,984 | A * | 8/2000 | Schmitz et al. | 280/124.136 |
| 6,116,626 | A * | 9/2000 | Cherry et al. | 280/124.135 |
| 6,290,244 | B1 * | 9/2001 | Hosoya | 280/124.157 |
| 6,516,914 | B1 * | 2/2003 | Andersen et al. | 180/360 |
| 6,520,494 | B1 * | 2/2003 | Andersen et al. | 267/273 |
| 6,719,314 | B1 * | 4/2004 | Schote | 280/124.135 |
| 6,733,021 | B1 * | 5/2004 | Ziech et al. | 280/124.109 |
| 6,915,873 | B2 * | 7/2005 | Woods et al. | 180/361 |
| 6,976,688 | B2 * | 12/2005 | Archer et al. | 280/124.134 |
| 2005/0200094 | A1 * | 9/2005 | Hozumi | 280/124.135 |
| 2005/0248116 | A1 * | 11/2005 | Fanson | 280/124.139 |
| 2006/0144626 | A1 * | 7/2006 | Mizutani et al. | 180/65.5 |
| 2006/0208447 | A1 * | 9/2006 | Eshelman et al. | 280/124.135 |
| 2006/0220338 | A1 * | 10/2006 | Orimoto et al. | 280/124.141 |

FOREIGN PATENT DOCUMENTS

| | | |
|---|---|---|
| EP | 0 253 383 | 1/1988 |
| EP | 0 287 278 | 10/1988 |
| EP | 0 706 904 | 4/1996 |
| FR | 1 533 988 | 7/1968 |

OTHER PUBLICATIONS

English translation of FR 1,533,988.

* cited by examiner

SIX LINK INDEPENDENT SUSPENSION FOR A DRIVE AXLE

RELATED APPLICATION

This application claims priority to U.S. Provisional Application No. 60/682,893 filed on May 20, 2005.

TECHNICAL FIELD

This invention generally relates to a spring bracket utilized in an independent suspension for a drive axle assembly.

BACKGROUND OF THE INVENTION

Independent suspension systems cooperate with a drive axle assembly to allow each wheel to move vertically without affecting a laterally spaced opposite wheel. An independent suspension system is subjected to many packaging and design constraints. A central carrier assembly drives a pair of wheel drive shafts, which in turn drive a pair of wheels. Suspension components must be packaged around the central carrier assembly and the wheel drive shafts. These suspension components include upper and lower control arms, shock absorbers, and air springs, for example.

It is desirable to provide a spring element, such as an air spring, at a position that is near an axle centerline in order to accommodate large turning angles and to minimize the size and weight of the lower control arm. This configuration is not easily achieved with current control arm designs. One solution utilizes a spring bracket configuration that is integrated into the lower control arm. This configuration is described in U.S. application Ser. No. 11/373,470, filed on Mar. 10, 2006, which claims priority to provisional application Ser. No. 60/663,800 filed on Mar. 21, 2005.

In this example configuration, the lower control arm includes a base portion, a pair of arms extending inwardly from the base portion for attachment to a vehicle chassis or subframe, and a spring bracket portion extending upwardly from the base portion that supports a spring directly over a wheel drive shaft centerline. While this configuration accommodates large turn angles and minimizes weight when compared to traditional designs, packaging space constraints can still be a problem for vehicles having large wheel travel excursions, i.e. large wheel jounce travel. When a wheel experiences large wheel jounce travel, the spring bracket portion is subjected to significant lateral movement. This lateral movement can bring the spring bracket portion, and/or the spring supported on the spring bracket portion, into contact with other vehicle or suspension components, which can adversely affect efficient operation of the independent suspension system or other vehicle systems.

For the above reasons, it would be desirable provide a control arm and spring bracket configuration that can accommodate large turn angles and minimize weight, as well as accommodating large wheel jounce travel.

SUMMARY OF THE INVENTION

An independent suspension for a drive axle includes a spring bracket that is pivotally connected to a lower control arm. The lower control arm has one end coupled to a knuckle and an opposite connected to a vehicle chassis or sub-frame. The pivotal connection between the spring bracket and the lower control arm allows the independent suspension to accommodate large wheel jounce travel.

The lower control arm and spring bracket are part of a control linkage that also includes an upper control arm and a torque rod. The knuckle has an upper boss, a lower boss, and a spindle that supports a wheel assembly. The lower control arm is coupled to the lower boss and the upper control arm is coupled to the upper boss. Opposite ends of each of the lower and upper control arms are attached to the vehicle chassis or sub-frame. In one example, the spring bracket includes first and second support plates that respectively support first and second springs on opposite sides of a drive shaft that extends through an opening in the spring bracket. The torque rod is pivotally connected to the spring bracket. The torque rod, knuckle, spring bracket, upper and lower control arms, and vehicle structure cooperate to provide a six link control that accommodates large wheel jounce travel.

These and other features of the present invention can be best understood from the following specification and drawings, the following of which is a brief description.

DETAILED DESCRIPTION OF THE PREFERRED EMBODIMENT

Figure 1:
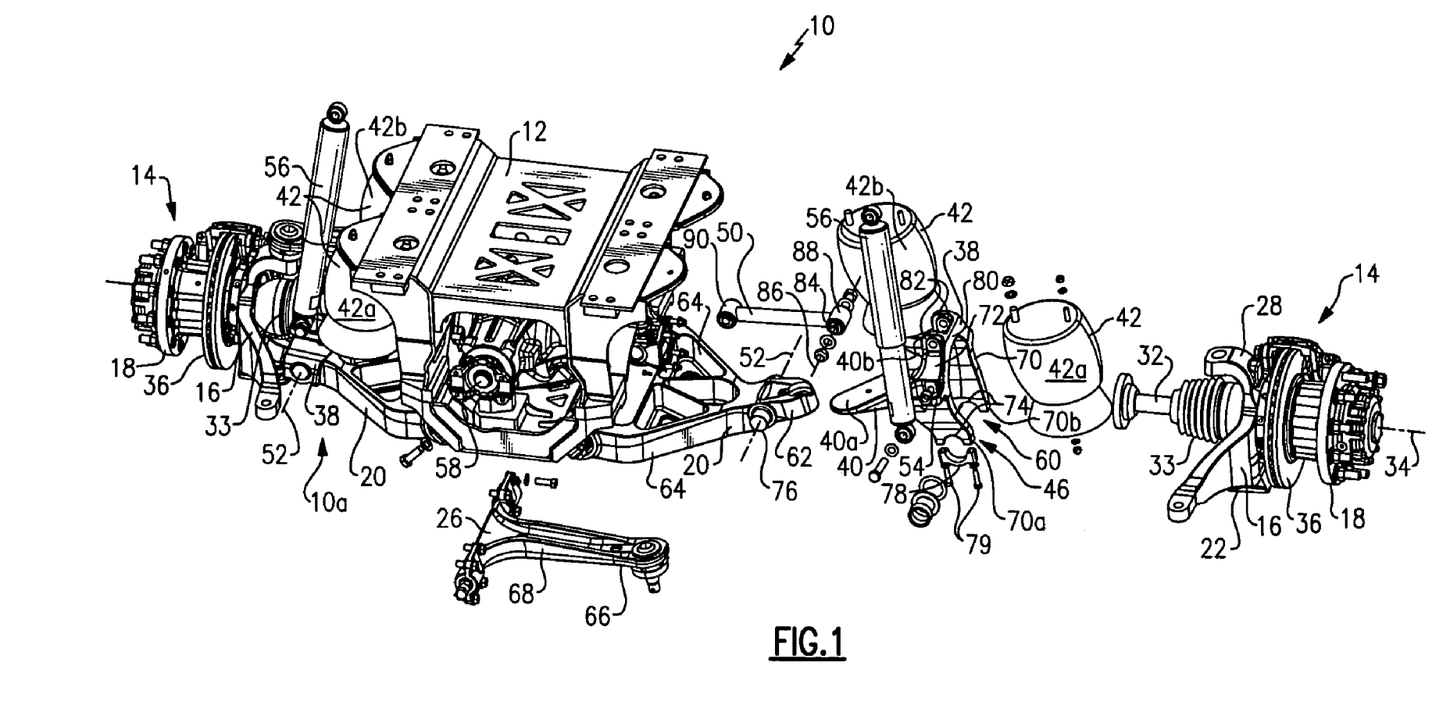
FIG. 1 is a perspective view of an independent suspension incorporating one example of the subject invention having one wheel end shown in an exploded view.
Figure 2:
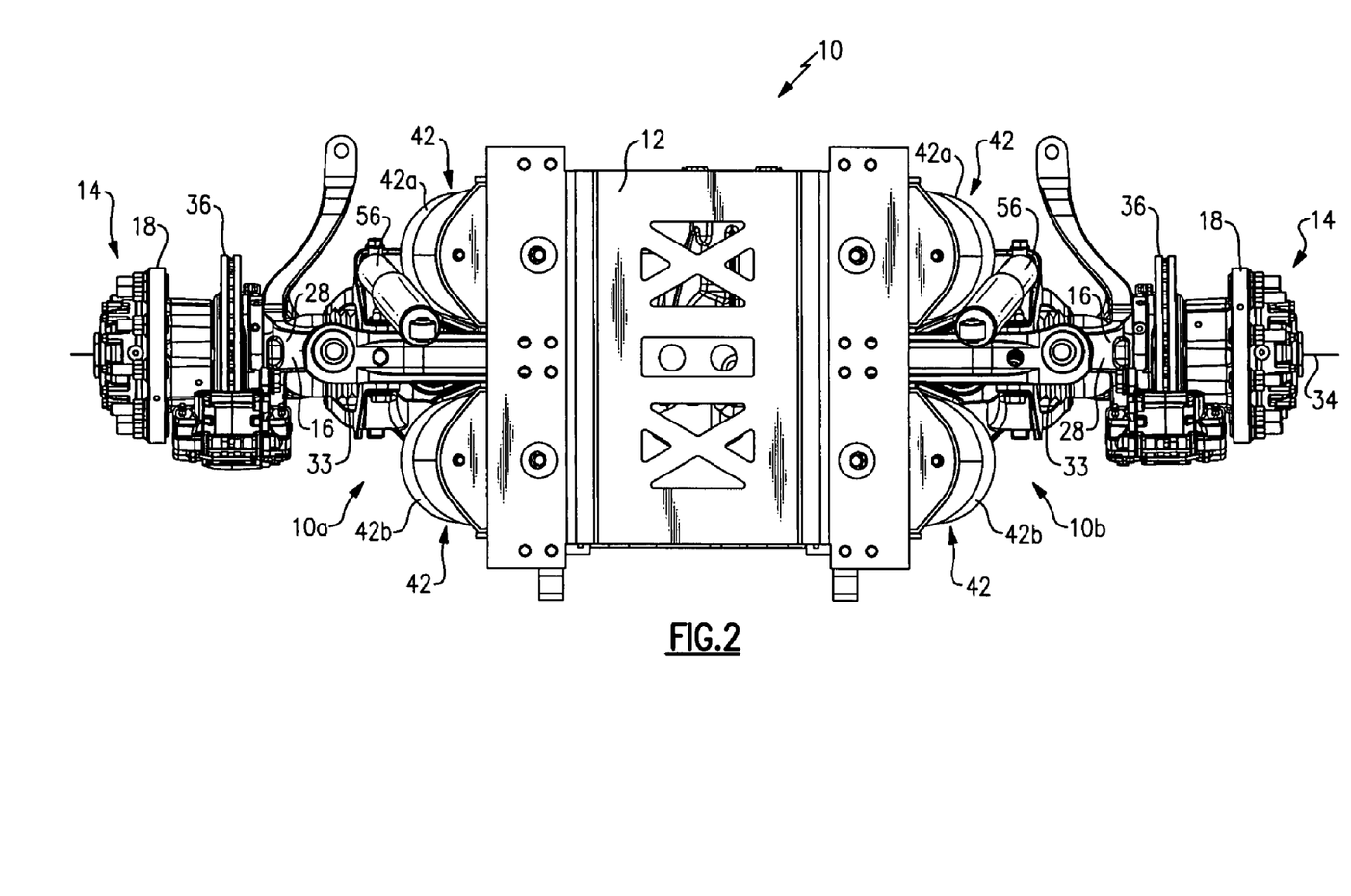
FIG. 2 is a top view of the independent suspension shown in FIG. 1.
Figure 3:
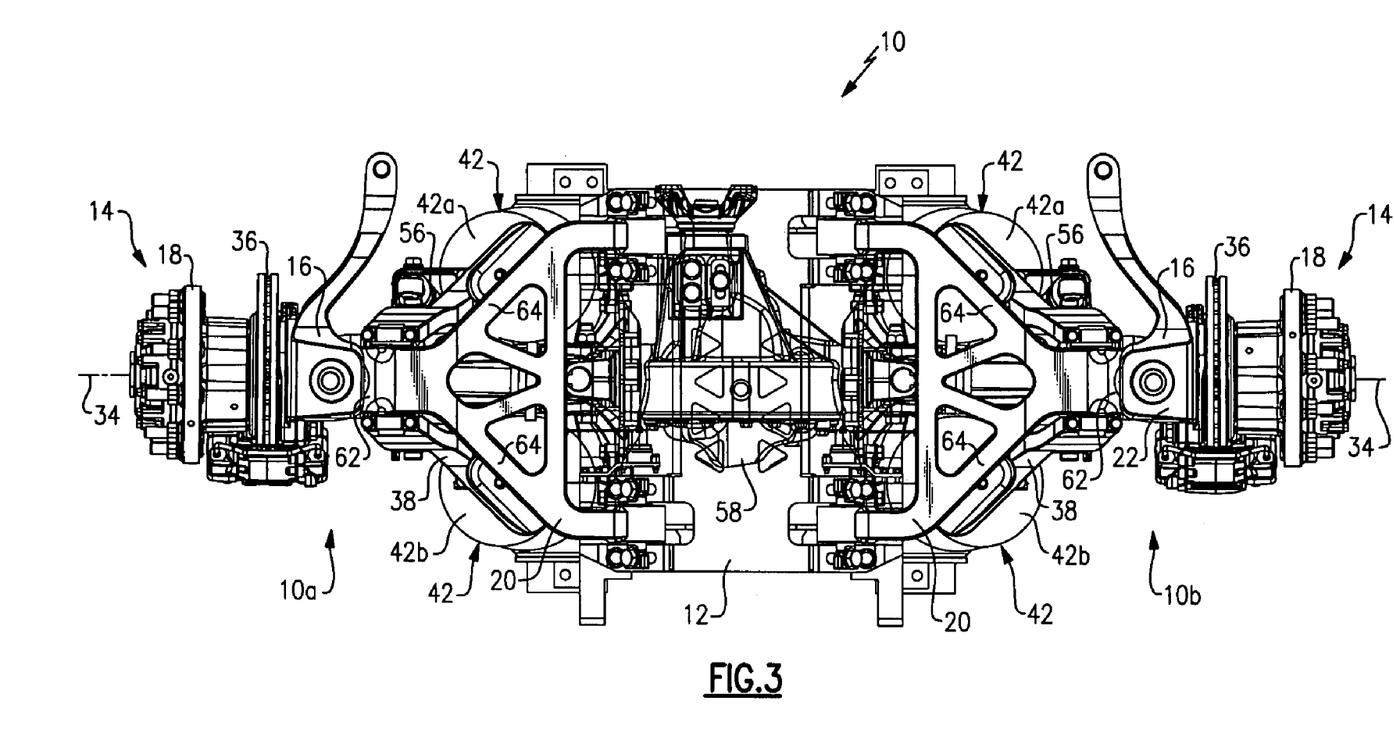
FIG. 3 is a bottom view of the independent suspension shown in FIG. 1.

An independent suspension is shown generally at 10 in FIG. 1. The independent suspension 10 is mounted on a vehicle chassis or suspension sub-frame 12 adjacent to laterally spaced wheel assemblies 14. Each wheel assembly 14 includes a separate independent suspension unit 10a, 10b that provides for independent wheel movement at each wheel assembly 14. In one example, the independent suspension 10 is utilized on an 8×8 vehicle (not shown), however, the independent suspension 10 could be utilized on other vehicle configurations.

The independent suspension unit 10a for the left hand wheel assembly 14 is fully assembled, and the independent suspension unit 10b for the right hand wheel assembly 14 is shown in an exploded view. FIGS. 2-5 show different views of the independent suspension units 10a, 10b fully assembled for both wheel assemblies 14.

Figure 4:
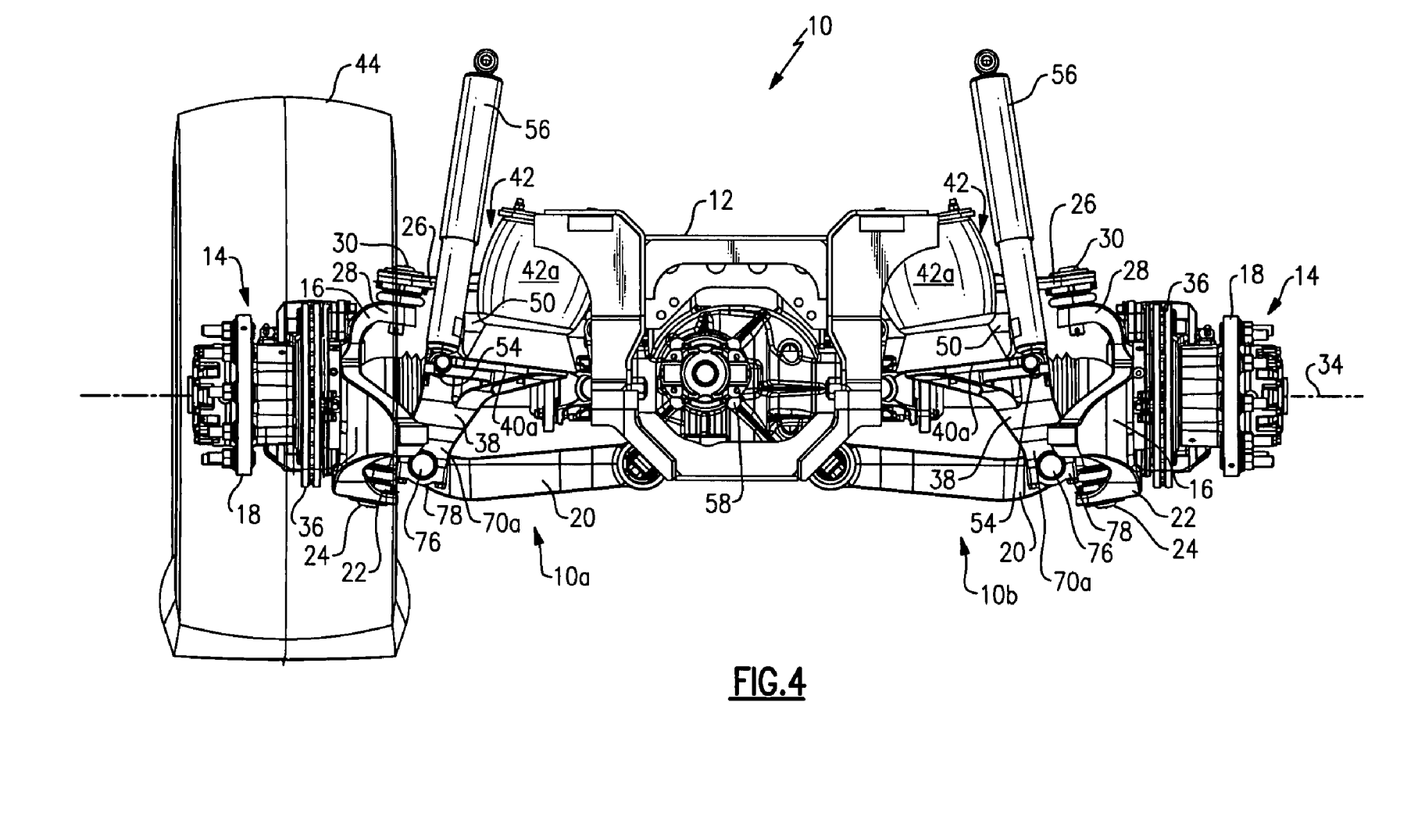
FIG. 4 is a front view of the independent suspension shown in FIG. 1.

Each wheel assembly 14 includes a knuckle 16 having a spindle that supports a wheel hub 18. As best shown in FIG. 4, a lower control arm 20 is attached to a lower boss 22 of the knuckle 16 with a first ball joint assembly 24, and an upper control arm 26 is attached to an upper boss 28 of the knuckle 16 with a second ball joint assembly 30.

As shown in FIG. 1, each wheel assembly 14 is driven by a drive shaft 32, which defines an axis of rotation 34. Each drive shaft 32 includes a protective cover 33 that encloses an exposed portion of the drive shaft 32. Only the protective cover 33 can be seen for the drive shaft 32 for the left hand wheel assembly 14 in FIG. 1. Each wheel assembly 14 also includes a brake 36. In the example shown, the brake 36 is a disc brake, however, other types of brakes could also be used. Further, as shown in FIG. 4 each wheel assembly 14 supports a tire 44 (only one is shown) as known.

The independent suspension 10 includes a spring bracket 38 having a support plate portion 40 that supports at least one air spring 42. In the example shown, the spring 42 is an air spring, however other types of spring elements could also be used. In the example shown, the support plate portion 40 includes a first plate portion 40a that supports a first air spring 42a, and a second plate portion 40b that supports a second air spring 42b. The first 40a and second 40b plate portions are spaced apart from each other and extend in different directions. The first 42a and second 42b air springs react between the support plate portion 40 and suspension sub-frame 12.

Figures 5, 6:
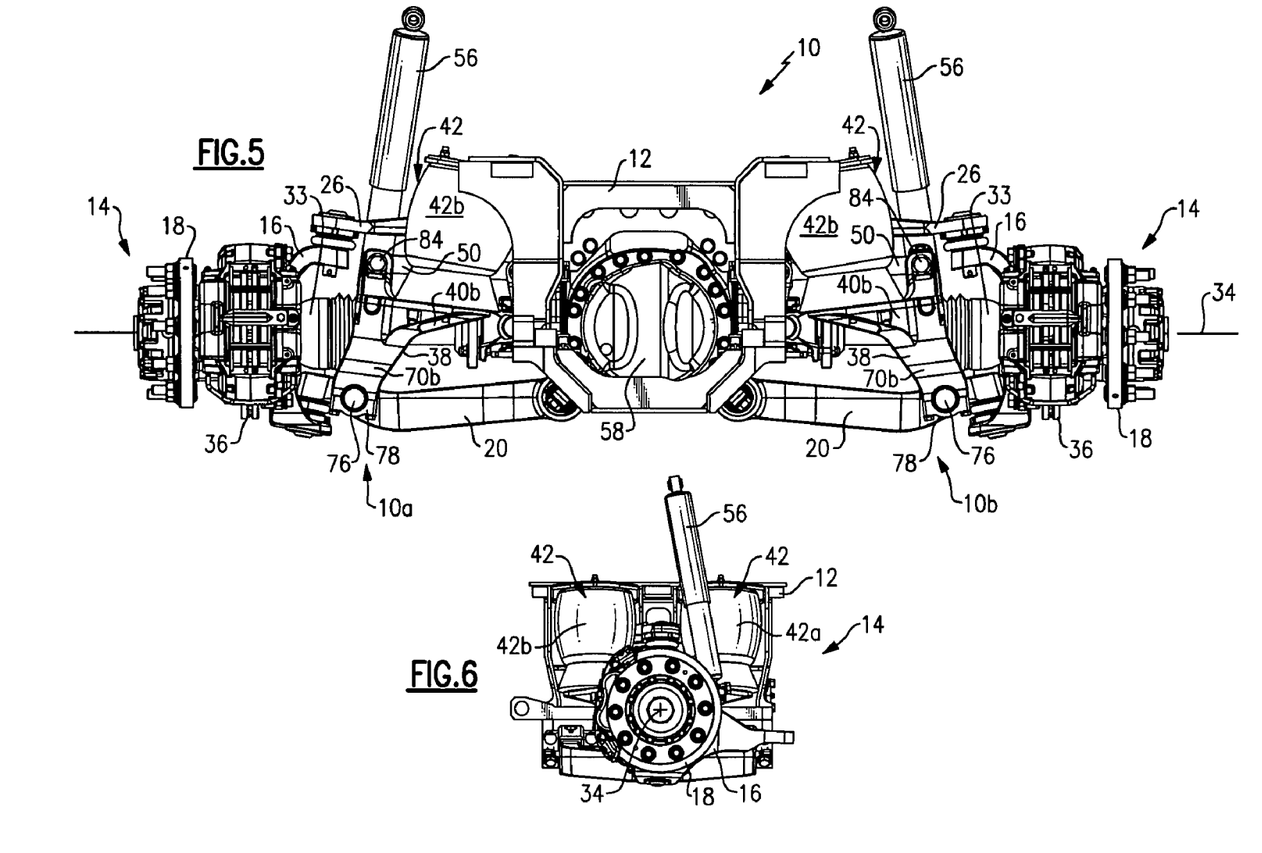
FIG. 5 is a rear view of the independent suspension shown in FIG. 1.
FIG. 6 is an end view of the independent suspension shown in FIG. 1.

The first 40a and second 40b plate portions are positioned such that the first 42a and second 42b air springs are longitudinally spaced apart from each other and supported on opposite sides of the drive shaft 32 from each other (see FIG. 6). Thus, the first air spring 42a is positioned on one longitudinal side of the drive shaft 32 and the second air spring 42b is positioned an opposite longitudinal side of the drive shaft 32.

The spring bracket 38 includes a first mount interface 46 for connection to the lower control arm 20 and a second mount interface 48 for attachment to a torque rod 50. The first mount interface 46 comprises a pivotal connection such that the spring bracket 38 can pivot about an axis 52 relative to the lower control arm 20. The axis 52 extends transversely relative to the axis of rotation 34. In the example shown, the spring bracket 38 also includes a third mount interface 54 for attachment to a shock absorber 56, however, the shock absorber 56 could optionally be attached to a different suspension component depending upon a desired suspension configuration. The shock absorber 56 cooperates with the first 42a and second 42b air springs to accommodate variations in road surfaces as known.

A central carrier assembly 58 drives the drive shafts 32 for both wheel assemblies 14. The central carrier assembly 58 is mounted to the vehicle chassis or suspension sub-frame 12 as known. The drive shafts 32 extend through an opening 60 formed in the spring bracket 38 for the independent suspension 10 at each wheel assembly 14. This allows the first 42a and second 42b air springs to be positioned close to the axis of rotation 34. The uniquely configured spring bracket 38 with this opening 60, and with the first 40a and second 40b plate portions, provides a compact, reduced weight suspension configuration that can accommodate large turning angles. Further, the pivotal connection between the spring bracket 38 and the lower control arm 20 can accommodate large wheel jounce travel without interfering with other suspension and/or vehicle components.

The lower control arm 20 extends underneath the drive shaft 32 and includes a mounting portion 62 that is mounted to the lower boss 22 of the knuckle 16. The lower control arm 20 also includes a pair of arms 64 that extend in an inboard direction away from the mounting portion 62. Each arm 64 is attached to the suspension sub-frame 12 as known.

The upper control arm 26 extends above the drive shaft 32 and includes a mounting portion 66 that is mounted to the upper boss 28 of the knuckle 16. The upper control arm 26 also includes an arm portion 68 that extends in an inboard direction from the mounting portion 66. The arm portion 68 is attached to the chassis or suspension sub-frame 12 as known.

The spring bracket 38 includes a downwardly extending portion 70 that defines the first mount interface 46 for connection to the lower control arm 20, and includes an upwardly extending portion 72 that defines the second mount interface 48 for attachment to the torque rod 50. The downwardly extending portion 70 comprises a pair of legs 70a, 70b that each include a curved surface 74. The curved surfaces 74 cooperate with a pin portion 76 that is associated with the lower control arm 20. Lower bracket pieces 78 (only one is shown) with associated curved surfaces are mounted underneath the pin portion 76 and are attached to the legs 70a, 70b with fasteners 79 such that the legs 70a, 70b and lower bracket pieces 78 surround the pin portion 76. This provides the pivotal connection between the lower control arm 20 and the spring bracket 38.

The pin portion 76 extends in a generally longitudinal direction and defines the axis 52 about which the spring bracket 38 pivots. The pin portion 76 can comprises a single pin body that is supported by the lower control arm 20, or the pin portion 76 could be formed as one piece with the lower control arm 20. Optionally, a pair of pin bodies, one on each side of the lower control arm 20, could be supported by, or integrally formed with, the lower control arm 20. The pin portion 76 is positioned closer to the mounting portion 62, which is connected to the knuckle 16, than the connection interface for the pair of arms 64.

The upwardly extending portion 72 transitions from the pair of legs 70a, 70b into a longitudinally extending base portion 80 that includes a pair of upwardly extending bosses 82. The bosses 82 support a pin 84 that defines a pivotal connection about an axis 86 for the second mount interface 48. The torque rod 50 has one end 88 supported on the pin 84 and an opposite end 90 mounted to the chassis or suspension sub-frame 12. The torque rod 50 stabilizes and orients the pivoting spring bracket 38. The axis 86 extends transversely to the axis of rotation 34, and is generally parallel to, and vertically higher than, the axis 52 for the first mount interface 46.

Figure 7:
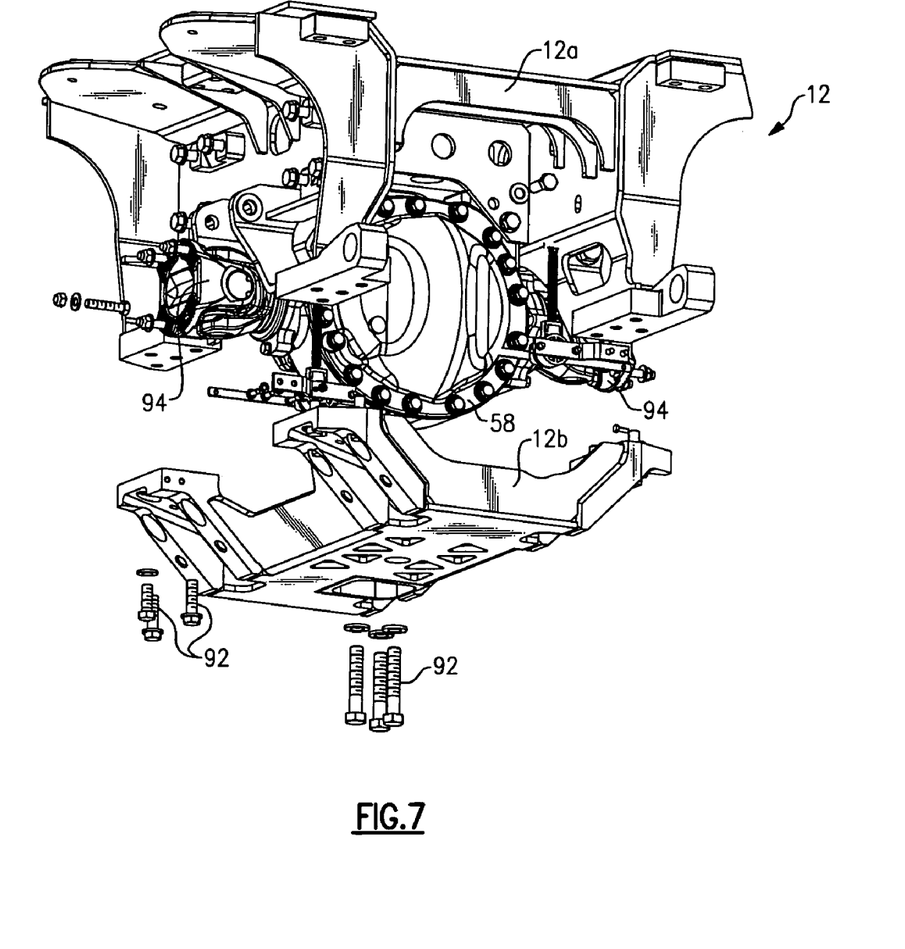
FIG. 7 is an exploded view of an example mount structure for the independent suspension of FIG. 1.

The suspension sub-frame 12 is shown in greater detail in FIG. 7. The sub-frame 12 includes an upper portion 12a and a lower portion 12b that is attached to the upper portion 12a with fasteners 92. The carrier assembly 58 is positioned between the upper 12a and lower 12b portions. The carrier assembly 58 is centrally positioned and includes drive gearing that provides driving input to the drive shafts 32 (FIG. 1). Inner drive shaft sub-assemblies 94 extend from opposite sides of the carrier assembly 58. Each inner driveshaft sub-assembly 94 attaches to a drive shaft 32 with threaded fasteners. Often, the inner drive shaft sub-assemblies 94 and drive shafts 32 are referred to as half-shafts because one inner drive shaft sub-assembly and an associated drive shaft 32 are coupled together to form a complete driving shaft for a vehicle wheel.

As discussed above, the opening 60 in the spring bracket 38 allows the drive shaft 32 to extend through the spring bracket 38 in order to drive the wheel assembly 14. The first 40a and second 40b plate portions for the first 42a and second 42b air springs are positioned on the spring bracket 38 between the first mount interface 46 and the second mount interface 48. The upper control arm 26 is connected to the knuckle 16 above the spring bracket 38 and torque rod 50, i.e. the upper control arm 26 is vertically higher than both the spring bracket 38 and torque rod 50.

The spring bracket 38 can be formed as a fabricated component constructed of multiple plate portions, or could be cast as a single piece. Further, the overall shape of the spring bracket 38 could vary depending on design and packaging constraints.

The torque rod 50, knuckle 16, spring bracket 38, upper 26 and lower 20 control arms, and the connection to the suspension sub-frame 12 cooperate to provide a six link control that accommodates both large turning angles and a significant amount of wheel jounce travel. This is accomplished by utilizing the unique spring bracket configuration that includes a pivotal attachment to the lower control arm 20, a pivotal attachment to the torque rod 50, and clearance for the drive shaft 32.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A linkage assembly for an independent vehicle suspension comprising:
   a lower control arm including structure for attachment to a knuckle and a vehicle structure;
   an upper control arm including structure for attachment to the knuckle and the vehicle structure;
   a spring bracket including a spring support portion for supporting at least one spring wherein said spring bracket is pivotally connected to said lower control arm, said spring bracket including a first mount interface for direct connection to said lower control arm; and
   a torque rod pivotally connected to said spring bracket.

2. A linkage assembly for an independent vehicle suspension comprising:
   a lower control arm including structure for attachment to a knuckle and a vehicle structure;
   a spring bracket including a spring support portion for supporting at least one spring wherein said spring bracket is pivotally connected to said lower control arm, and wherein said spring bracket includes an opening through which a wheel drive shaft extends; and
   a torque rod pivotally connected to said spring bracket.

3. The linkage assembly according to claim 2 wherein said spring bracket includes a downwardly extending portion that defines a first pivotal mount for said lower control arm, and an upwardly extending portion that defines a second pivotal mount for said torque rod, and wherein said spring support portion extends in an inboard direction and is positioned vertically between said first pivotal mount and said second pivotal mount.

4. The linkage assembly according to claim 3 wherein said at least one spring comprises first and second springs and wherein said spring support portion comprises a first plate that supports said first spring and a second plate that supports said second spring.

5. The linkage assembly according to claim 4 wherein the wheel drive shaft defines an axis of rotation and wherein said first spring is positioned on one longitudinal side of said axis of rotation and said second spring is positioned on an opposite longitudinal side of said axis of rotation.

6. A linkage assembly for an independent vehicle suspension comprising:
   a lower control arm including structure for attachment to a knuckle and a vehicle structure;
   an upper control arm including structure for attachment to the knuckle and the vehicle structure;
   a spring bracket including a spring support portion for supporting at least one spring wherein said spring bracket is pivotally connected to said lower control arm, and wherein said lower control arm includes a first mount for connection to the knuckle, a second mount that defines a pivotal connection to said spring bracket, and a third mount for connection to the vehicle structure wherein said second mount comprises at least one longitudinally extending pin portion; and
   a torque rod pivotally connected to said spring bracket.

7. The linkage assembly according to claim 6 wherein said spring bracket includes a downwardly extending portion that is mounted on said at least one longitudinally extending pin portion to form said pivotal connection.

8. The linkage assembly according to claim 1 wherein said spring bracket includes a shock mounting interface for attachment to a shock absorber.

9. An independent suspension for a drive axle comprising:
   a knuckle having an upper boss and a lower boss, said knuckle including a spindle that supports a rotating wheel component;
   a lower control arm having one end coupled to said lower boss and an opposite end including structure for attachment to a vehicle structure;
   an upper control arm having one end coupled to said upper boss and an opposite end including structure for attachment to the vehicle structure;
   a spring bracket pivotally connected to said lower control arm and including a support plate for supporting at least one spring, and wherein said spring bracket includes a first mount interface for direct connection to said lower control arm; and
   a torque rod pivotally connected to said spring bracket at one end and including structure for attachment to the vehicle structure at an opposite end.

10. An independent suspension for a drive axle comprising:
    a knuckle having an upper boss and a lower boss, said knuckle including a spindle that supports a rotating wheel component;
    a lower control arm having one end coupled to said lower boss and an opposite end including structure for attachment to a vehicle structure;
    an upper control arm having one end coupled to said upper boss and an opposite end including structure for attachment to the vehicle structure;
    a spring bracket pivotally connected to said lower control arm and including a support plate for supporting at least one spring;
    a torque rod pivotally connected to said spring bracket at one end and including structure for attachment to the vehicle structure at an opposite end; and
    a drive shaft that drives said rotating wheel component, said drive shaft extending through an opening formed within said spring bracket.

11. The independent suspension according to claim 10 wherein said spring bracket includes a first mount interface defining a first pivotal connection to said lower control arm, and a second mount interface defining a second pivotal connection to said torque rod, and wherein said support plate is positioned vertically between said first and said second pivotal connections.

12. The independent suspension according to claim 11 wherein said support plate comprises a first portion extending in a first direction and a second portion extending in a second direction different than said first direction, and wherein said at least one spring comprises a first spring supported on said first portion and a second spring supported on said second portion such that said first and second springs are positioned on opposite sides of said drive shaft.

13. The independent suspension according to claim 12 wherein said lower control arm includes at least one pin and wherein first mount interface comprises a curved surface that cooperates with said at least one pin.

14. The independent suspension according to claim 11 wherein said spring bracket includes a third mount interface for attachment to a shock absorber.

15. A linkage assembly for an independent vehicle suspension comprising:
   an upper control arm;
   a lower control arm including structure for attachment to a knuckle and a vehicle structure;
   a spring bracket including a spring support portion for supporting at least one spring wherein said spring bracket is directly connected to said lower control arm at a pivot; and
   a link pivotally connected to said spring bracket.

16. The linkage assembly according to claim 15 wherein said spring bracket includes a downwardly extending portion that defines a first pivotal mount for said lower control arm at said pivot, and an upwardly extending portion that defines a second pivotal mount for said link, and wherein said first pivotal mount and said second pivotal mount respectively provide first and second pivotal axes generally parallel to each other.

17. The linkage assembly according to claim 15 wherein said at least one spring is non-concentric with a shock absorber.

18. The linkage assembly according to claim 15 wherein said at least one spring comprises at least one air spring.

19. A linkage assembly for an independent vehicle suspension comprising:
   a lower control arm including structure for attachment to a knuckle and a vehicle structure;
   a spring bracket including a spring support portion for supporting at least one spring wherein said spring bracket is pivotally connected to said lower control arm, and with said spring bracket including a first mount interface for direct connection to said lower control arm, and wherein said first mount interface defines a spring bracket pivot axis and wherein the vehicle structure comprises a suspension sub-frame;
   a link pivotally connected to said spring bracket; and
   a central carrier mounted to said suspension sub-frame and at least one drive shaft driven by said central carrier, said at least one drive shaft driving a wheel component about a wheel axis of rotation, and wherein said spring bracket includes an opening through which said at least one drive shaft extends for connection to said wheel component such that said wheel axis of rotation is vertically higher than said spring bracket pivot axis.

20. The linkage assembly according to claim 15 wherein said lower control arm is connected to a lower boss of said knuckle with a single ball joint assembly and wherein said lower control arm is generally V-shaped having a mounting portion for said single ball joint assembly located at an apex and including first and second arms that extend inboard from said apex to be attached to the vehicle structure.

21. The linkage assembly according to claim 1 wherein said lower control arm is connected to a lower boss of said knuckle with a single ball joint assembly.

22. The linkage assembly according to claim 21 wherein said lower control arm is generally V-shaped having a mounting portion for said single ball joint assembly located at an apex and including first and second arms that extend inboard from said apex to be attached to the vehicle structure.

23. The independent suspension according to claim 9 wherein said first mount interface defines a spring bracket pivot axis and wherein the vehicle structure comprises a suspension sub-frame, said linkage assembly including a central carrier mounted to said suspension sub-frame and at least one drive shaft driven by said central carrier, said at least one drive shaft driving a wheel component about a wheel axis of rotation, and wherein said spring bracket includes an opening through which said at least one drive shaft extends for connection to said wheel component such that said wheel axis of rotation is vertically higher than said spring bracket pivot axis.

24. The independent suspension according to claim 9 wherein said lower control arm is connected to said lower boss of said knuckle with only one ball joint assembly and wherein said lower control arm is generally V-shaped having a mounting portion for said ball joint assembly located at an apex and including first and second arms that extend inboard from said apex to be attached to the vehicle structure.

25. A linkage assembly for an independent vehicle suspension comprising:
   a lower control arm including structure for attachment to a knuckle and a vehicle structure;
   a spring bracket including a spring support portion for supporting at least one spring wherein said spring bracket is directly connected to said lower control arm at a pivot, and wherein said spring bracket includes an opening through which a wheel drive shaft extends; and
   a link pivotally connected to said spring bracket.

26. The linkage assembly according to claim 15 wherein said lower control arm includes a first mount for connection to the knuckle, a second mount that defines a pivotal connection to said spring bracket at said pivot, and a third mount for connection to the vehicle structure wherein said second mount comprises at least one longitudinally extending pin portion.

\* \* \* \* \*